Jan. 15, 1963 W. L. MINTO 3,072,978
AIR PURIFIER
Filed March 17, 1959

INVENTOR
WALLACE L. MINTO
BY Stanley Welder
ATTORNEY

United States Patent Office 3,072,978
Patented Jan. 15, 1963

3,072,978
AIR PURIFIER
Wallace L. Minto, River Vale, Westwood, N.J., assignor to Modern Aids, Inc., New York, N.Y., a corporation of New York
Filed Mar. 17, 1959, Ser. No. 799,995
8 Claims. (Cl. 21—74)

The present invention relates to an air purifier and more particularly to one incorporating means for filtering the air, sanitizing it and introducing negative ions therein.

Devices for filtering and treating the air are legion. Those, however, which are designed to sanitize and otherwise treat the air in a room or other enclosure have, for the most part, been inefficiently constructed and failed to take full advantage of the ionizing ability of the radiation emitted by germicidal, and other lamps, to introduce high levels of negative ions.

It is, therefore, a principal object of the present invention to provide an air treatment device which is capable of efficiently employing germicidal lamps not only to destroy bacteria and other relatively undifferentiated organisms which may be deleterious to higher forms of life but also to employ the radiation of such lamps to secure an increased supply of negative ions.

It is another object of the present invention to provide such a device in which the components are so arranged as to achieve maximum efficiency with a minimum of components and power.

The above and other objects may be attained by mounting to and within a housing, in series, an air filter and mercury vapor lamp which emits radiation of relatively high energy, an ion-producing plate or grid positioned to intercept some of such radiation and furnish negatively charged ions to air stream passing through said housing, and a fan or other means of propelling air positioned to direct the air from said housing.

Other objects and a fuller understanding of the present invention may be had by referring to the following detailed description and claims, taken in conjunction with the accompanying drawings which illustrate preferred embodiments thereof, it being understood that the foregoing statement of the objects of the invention and the brief summary thereof is intended to generally explain the same without limiting it in any manner.

Figure 1:
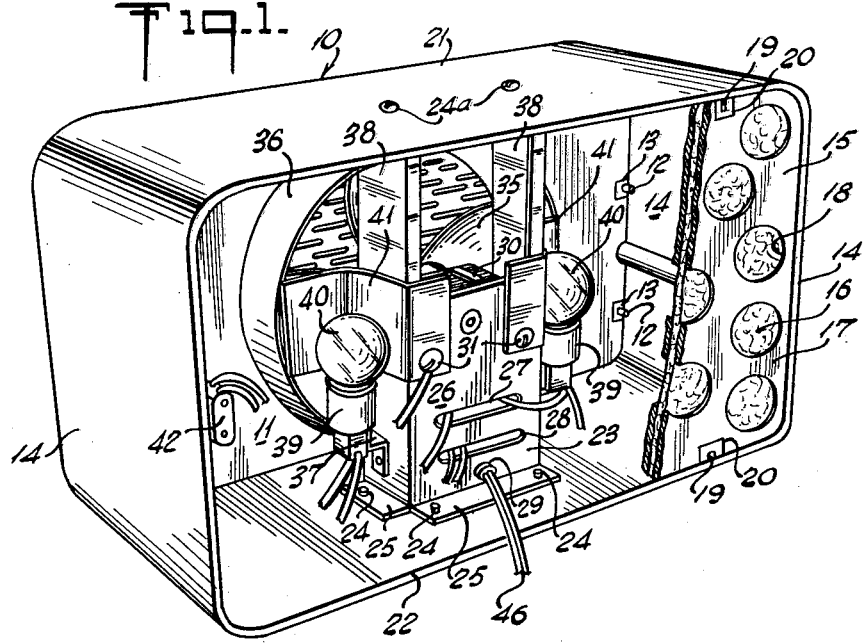
FIG. 1 is a perspective view taken from the rear of an air purifier embodying the present invention, a portion of the air filter being cut away to disclose the interior of said purifier.

Referring now to the drawings and the embodiment of the present invention there shown, the same consists of a housing 10 which may be of plastic molded construction, the front wall 11 of which may comprise a grill, screen or perforated or slotted sheeting (the last being illustrated in the drawing) and which may be secured by screws 12 to ears 13 protruding from side walls 14 of housing 10.

The rear wall of housing 10 may be composed of an ordinary air filter 15 which preferably extends along the entire length of the rear of said housing and which may be made by incorporating glass wool 16 or other fibrous material between sheets 17 of cardboard and the like having enlarged aligned apertures 18 formed therein. Filter 15 may similarly be secured to the body of housing 10 by means of screws 19 which engage ears 20 extending from top and bottom walls 21 and 22 respectively.

A U-shaped standard 23 is mounted to bottom wall 22 by means of rivets 24 which extend through said wall and engage flanges 25 extending outwardly from standard 23 and is secured to top wall 21 by means of machine screws 24a. The rear top portion of said standard 23 is cut away to provide a better flow of air. The lower central portion 26 of said standard has formed therein two slots 27 and 28 and a bore 29 to permit the entry therethrough of electrical connections and to provide air ingress means to ventilate a fan motor 30 secured to said central portion 26 by means of machine screws 31 which extend through stand-offs 32.

An output shaft 33 driven by said motor extends forwardly and mounts a fan element 34 having fan blades 35. A cowl 36 circumferentially surrounds fan element 34 and serves to direct the air flow from the purifier. To assure that there will be no inward air flow through wall 11 and therefore to confine the ingress of air to a path through filter 15, those portions of front wall 11 which do not lie within cowl 36 may be solid or, if it is not convenient to have the entire front wall perforated for reasons of design or otherwise, then liners of cardboard or other solid sheet material may be placed along that portion of the inside of wall 11 which does not lie within cowl 36.

Upon brackets 37 secured to side walls 38 of standard 23 there may be mounted sockets 39 which in turn mount germicidal mercury vapor lamps 40. An ion emitter 41 in the form of an arcuate plate may be mounted opposite each of such lamps extending between and secured at either end to side walls 38 of standard 23 and cowl 36. It is desirable to position said emitter so as to intercept the maximum amount of radiation from said lamps which their area will permit.

A bat-handled toggle switch 42 is mounted through front wall 11 and secured thereto by means of a hex nut 43 and a round knurled nut 44 which engage the threaded shank 45 of said switch. Electrical power is brought to the device by means of a line cord 36. In conventional fashion switch 42 is electrically connected in series with one branch of said line cord while lamps 40 and motor 30 are connected across the branches of said cord distally from the point of connection in said switch so that as said switch is closed power will simultaneously be fed to both said lamps and motor.

Figure 2:
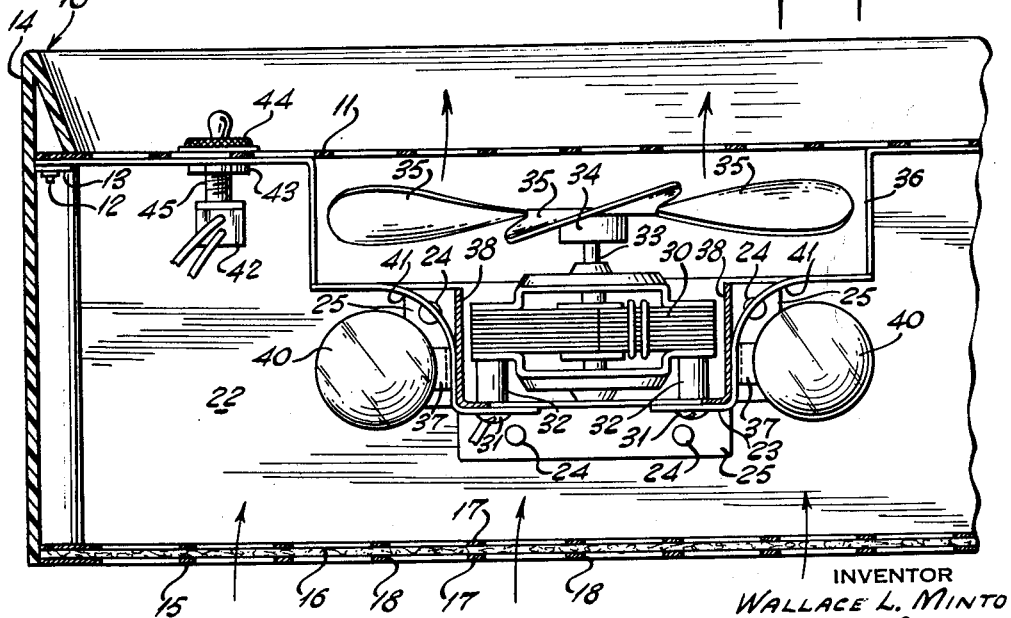
FIG. 2 is a fragmentary top sectional perspective view of said purifier.

Air flow through the device will follow the arrows shown in FIG. 2, i.e. the air will enter the purifier through filter 15, be irradiated by lamps 40, pick up ions emitted from negative ion emitter 41, and be expelled by the blades of fan element 34 through the opening in front wall 11.

The provision of negative ion emitter and the positioning of the various components are significant. Thus, by positioning the filter across the air ingress portion of the purifier and arranging said air ingress so that it covers substantially the entire greatest wall dimension, i.e. that of the rear wall, not only is an extensive filter area and volume provided and thereby filter action maximized but the dust particles so removed prior to radiation by the ultra violet lamps are prevented from coating such lamps (and thus reducing their output) and likewise are prevented from forming shaded hiding places for airborne bacteria and other organisms.

Additionally, by so placing the filter, the ozone output of the lamps is not reduced by passing through the filter. It is well known, of course, that ozone decomposes very rapidly upon contact with surfaces. Similarly, ions, and especially negative ions which have greater mobility than positive ions, are lost when they meet a filter surface. Hence it is desirable that they do not contact the filter as they are presented to the air stream either as a result of radiation by lamps 40 of air and the like or emitted from emitter 41.

Again, dust particles may coat the surface of ion emitter 41 and thus substantially reduce its emissive capacity. Obviously, the positioning of the filter across the input or ingress to the purifier will minimize such deposition. There is, of course, the additional advantage in so positioning the filter that it avoids the undesirable result which occurs when ultra-violet radiation proceeding from lamps 40 strike airborne particles causing them to have a positive charge. This in turn produces two objectionable results: first, such positive ions tend to neutralize the beneficial negative ions in the air stream; second, positive ions are themselves physiologically objectionable.

It has been mentioned that the ion emitter should be located so as to intercept the maximum amount of radiation consistent with the area. This, of course, means that they should be placed as closely as reasonably possible to the lamps 40 and that their configuration should generally be sections of a spherical surface. However, even more important, upon the question of proximity of lamp and emitter is the fact that the ultra-violet emission of the lamps at 1849 Angstroms is rapidly absorbed upon passage through air. Since it is this wave length which is the most effective for the liberation of photoelectrons, lamp-emitter distance should be kept to an absolute minimum consistent with other design considerations.

The ion emitter has been described as a plate. It may, of course, be a grill or a screen. Its advantage when in the plate form is that it acts as a radiation shield and prevents the passage of ultra violet radiation through the apertures in front wall 11 within cowl 36. When emitter 41 is in the form of an apertured plate or screen or grill, it is preferable that the apertured portion of wall 11 contain louvres or other shielding devices to prevent direct ultra-violet radiation of the user.

In designing emitter 41 certain considerations must be kept in mind. The material, or at least the work surface of which it is made, should have as low an electron work function as possible. The material should be electrically conductive. It should not form an insulating surface film under the chemical influence of oxygen or ozone at ordinary temperatures and pressures.

Of course, the grids, and more particularly, the work areas thereof, may be made of multiple layers by electroplating or coating or the like, in order to produce a surface layer of a higher negative potential by reason of the contact potentials which exist between such layers. Suitable emitter plates, grids or screens may consist of copper coated with copper oxide, or tin-plated steel, or thoria-coated steel or graphite-coated steel or high purity aluminum (e.g. low silicone and phosphorus content).

Since the electron emission is excited by ultra-violet radiation produced by a mercury arc, the electron work function of the grid surface, expressed in volts, must be less than the quantum energy of the ultra-violet wavelengths used. The relation between electron volts and wavelength is:

$$V = \frac{12367}{A}$$

where $A$ = wavelength in Angstroms. Since the two important mercury lines used are at 1849 and 2537 Angstroms, corresponding to 6.69 and 4.87 volts respectively, the work function of the emitter surface must be less than 6.6 volts and preferably less than 4.8 volts.

The ion-emitting plate or grid should be grounded so as to provide it with a continuous source of ions. This may be done in a very neat fashion in the embodiment shown by connecting such plates to the power line with one lead. For safety's sake, this connection should be made through a high resistance which serves to limit the amount of current which may be conducted if anyone were to accidentally touch them while the unit is operating. By using a 250,000 ohm resistor, for example, the maximum current which could be passed to a grounded person (at 115 volts) would be less than a half of a milliampere, which is not likely to produce any damage.

An additional saving in parts may be achieved if instead of using a separate choke or resistor as ballast for the mercury lamps one connects them in series with the fan motor, employing the latter as a current limiting device.

Although the present invention has been described with a certain degree of particularity, it is understood that the present disclosure has been made only by way of example and that numerous variations may be employed without transcending the scope of the invention as hereinafter claimed.

What is claimed is:

1. An air purifier comprising a housing having formed in the walls thereof an air inlet and an air outlet, an air-moving device positioned within said housing to draw air along a path from said air inlet to said air outlet, an air filter connected to said housing and positioned along said path, an ionizing source of radiation mounted within said housing in position to irradiate air proceeding along said path, and a grounded photoelectron emitter mounted within said housing in close proximity to said ionizing source in a position to intercept some of the radiation proceeding from said ionizing source and having a work function less than the quantum level of said radiation whereby upon receipt of said radiation said emitter emits electrons which enter said path.

2. An air purifier as described in claim 1, said emitter being positioned within said housing to intercept radiation from said ionizing source which, if not so intercepted, would proceed through said air outlet.

3. An air purifier as described in claim 1, said air filter being positioned across said air inlet.

4. An air purifier as described in claim 1, said ionizing source being a mercury lamp emitting ultra-violet radiation in the wave lengths 1849 and 2537 Angstroms, and said emitter having a work surface whose work function is less than 6.6 volts.

5. An air purifier as described in claim 1, a source of electric energy for said air-moving device including a conduit therefor connected to said air-moving device, said connection to ground of said emitter including a high resistance and terminating in one line of said conduit.

6. An air purifier comprising a housing having formed in the walls thereof an air inlet and an air outlet, an air-moving device positioned within said housing to draw air along a path from said air inlet to said air outlet, an air filter connected to said housing across said path, an ultra-violet radiation generator in the form of a mercury lamp mounted within said housing and positioned to irradiate air proceeding along said path, a grounded photoelectron emitter mounted within said housing in close proximity to said mercury lamp and positioned to intercept some of the radiation proceeding from said ionizing source, the work function of surface of said emitter being less than 6.6 volts.

7. An air purifier as described in claim 6, said emitter being in the form of a sheet of material interposed between said lamp and said air outlet.

8. An air purifier as described in claim 6, a source of electric power connected to said air-moving device, said air-moving device including an electric motor, said mercury lamp being connected across said source of electric power but in series with the electric motor.

References Cited in the file of this patent

UNITED STATES PATENTS

| 2,183,498 | Anderson | Dec. 12, 1939 |
| 2,639,972 | Hicks | May 26, 1953 |
| 2,717,971 | Sheldon | Sept. 13, 1955 |
| 2,825,102 | Hicks | Mar. 4, 1958 |
| 2,855,641 | Stein | Oct. 14, 1958 |

OTHER REFERENCES

Skilling et al.: "Control of Air Ion Density in Homes," paper presented at Winter General Meeting, AIEE, Jan. 22, 1953.

Notice of Adverse Decision in Interference

In Interference No. 94,239 involving Patent No. 3,072,978, W. L. Minto, AIR PURIFIER, final judgment adverse to the patentee was rendered Aug. 16, 1966, as to claims 1, 2, 3, 4, 6 and 7.

[*Official Gazette October 25, 1966.*]